March 20, 1973 C. A. LEE ET AL 3,721,016
METHOD OF REMOVING CONDENSATE FROM A ROTARY DRYER
Original Filed Aug. 4, 1969 3 Sheets-Sheet 2
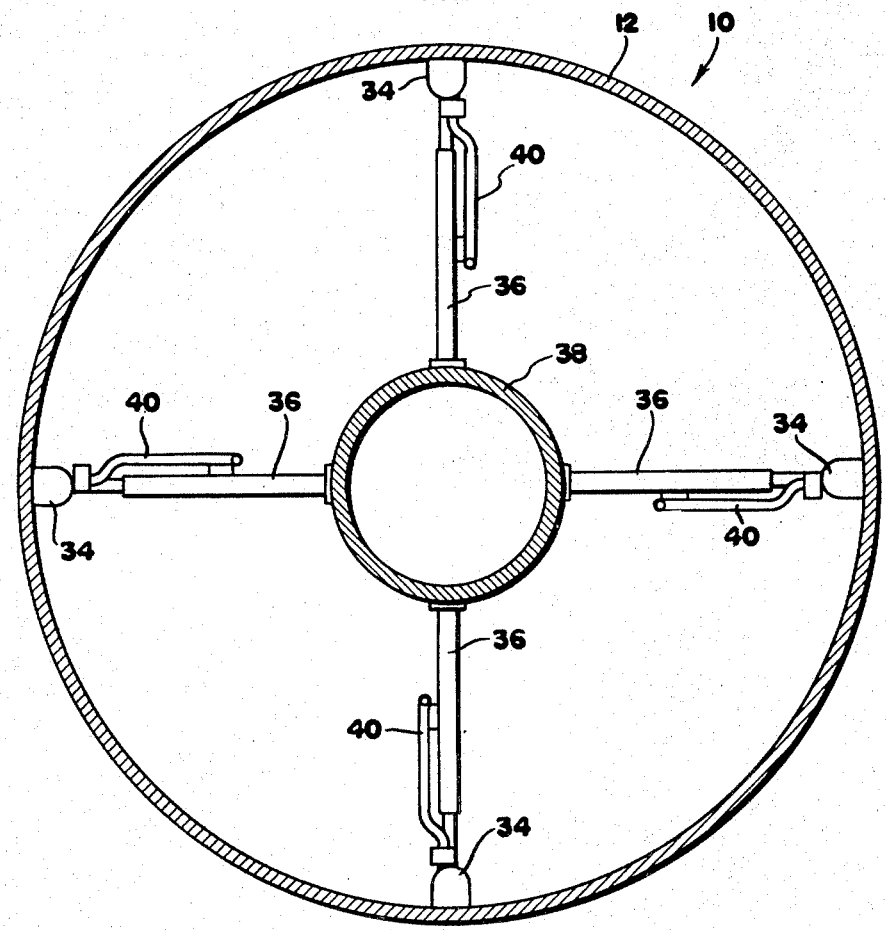
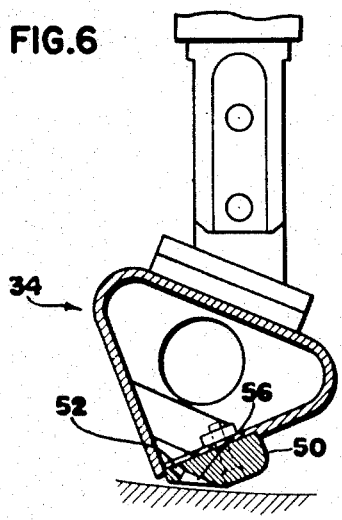
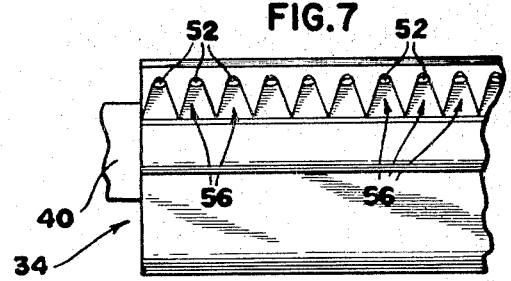
INVENTORS
CHARLES A. LEE
FRANK D. SORRELLS
ATTYS.

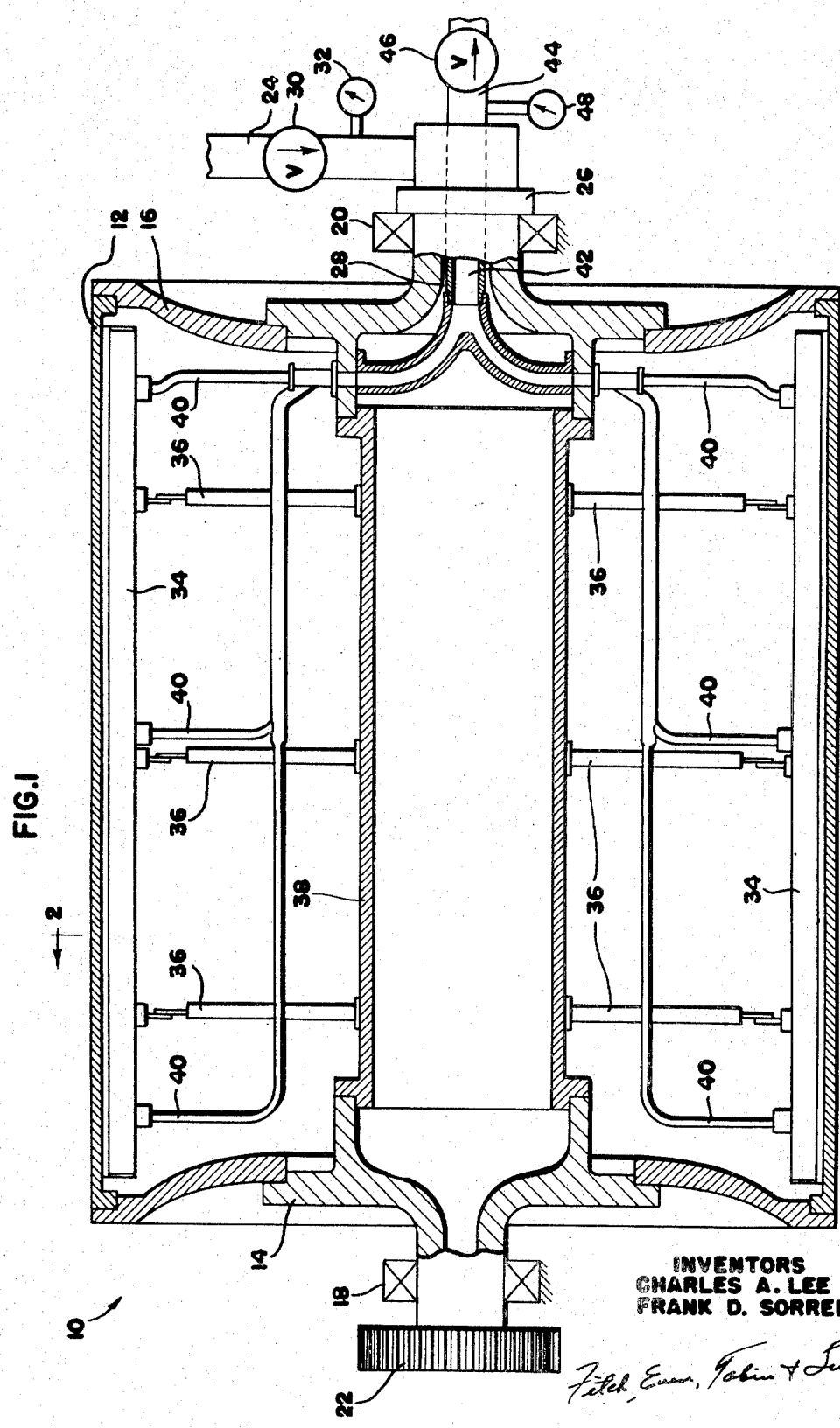

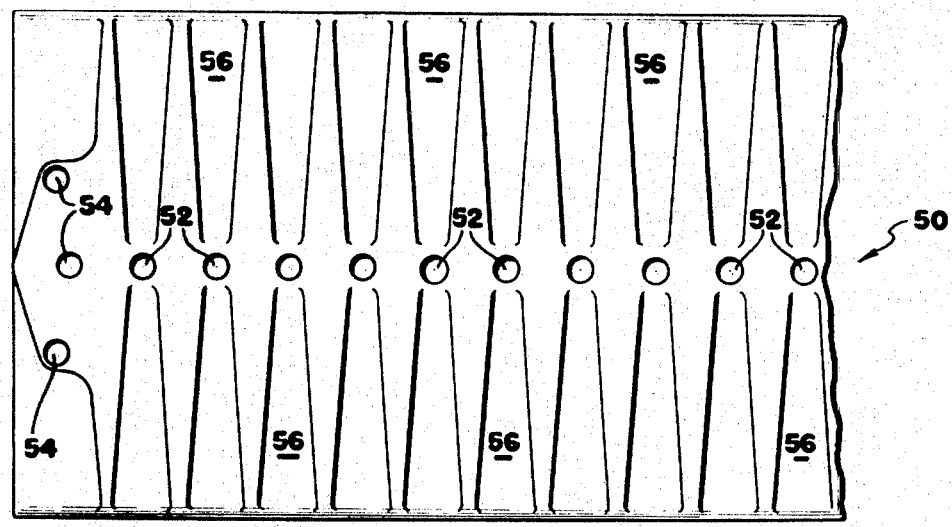
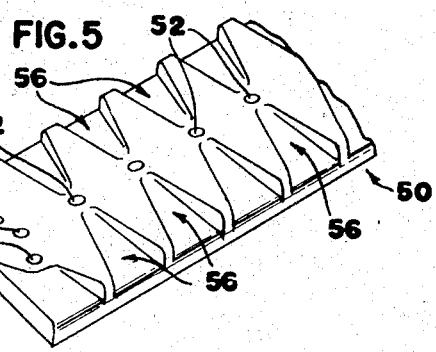
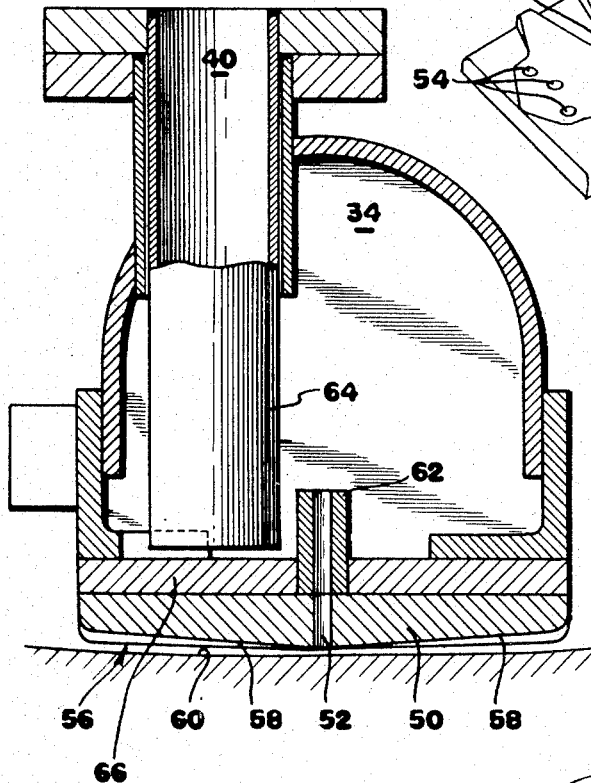

United States Patent Office 3,721,016
Patented Mar. 20, 1973

3,721,016
METHOD OF REMOVING CONDENSATE FROM A ROTARY DRYER
Charles A. Lee and Frank D. Sorrells, Knoxville, Tenn., assignors to International Paper Company, New York, N.Y.
Original application Aug. 4, 1969, Ser. No. 847,111, now Patent No. 3,640,000, dated Feb. 8, 1972. Divided and this application June 30, 1971, Ser. No. 158,478
The portion of the term of the patent subsequent to Feb. 8, 1989, has been disclaimed
Int. Cl. F28g 13/04
U.S. Cl. 34—125          4 Claims

ABSTRACT OF THE DISCLOSURE

Condensate rimming the inner surface of the shell of a rotary dryer is removed with steam exiting from the interior of the shell through a plurality of orifices into an exhaust manifold within the shell, whence it is exhausted to the exterior of the shell. To assist in removal of the condensate, a plate attached to the manifold forms a plurality of flow channels substantially parallel to the surface of the condensate. The cross-sectional area of the flow channels decreases in the direction of flow of the steam so that steam driven from the interior of the shell is accelerated along the surface of the condensate over a substantial distance to shear water from the inner surface of the shell and entrain the water in the steam as the steam passes through the orifices into the manifold.

---

This application is a division of Ser. No. 847,111, filed Aug. 4, 1969, now Pat. No. 3,640,000 granted Feb. 8, 1972.

This invention relates to a method of removing the condensate rimming the shell of a rotary dryer and more particularly to a method of and system for assisting the removal of the condensate by enhancing the entrainment of the condensate in steam leaving the interior of the shell.

In certain rotary dryers, such as Yankee dryers for paper-making machines, steam is applied under pressure into the hollow interior of a dryer shell, thereby heating the shell to an elevated temperature sufficient to dry material, such as a paper web, passed over the outer surface of the shell. The steam, upon giving up its heat to the shell, condenses to form condensate. The dryers are rotated at such high rates that the resulting condensate rims the interior of the shell; that is, centrifugal force holds the liquid condensate against the inner surface of the shell as the shell rotates. The condensate is removed from the inner surface of the shell by an exhaust system disposed adjacent such inner surface of the shell, utilizing the steam pressure within the shell to drive the condensate into the exhaust system and out of the shell.

The difficulty with previous exhaust systems has been their inability to remove large amounts of condensate efficiently. For economy of operation, it is desirable to operate paper-making machines at faster and faster speeds. This requires more rapid drying of the paper web by the dryers. More rapid drying may be achieved by increasing the steam pressure within the dryer shells to increase dryer temperature; however, faster drying results in an increase in the rate of formation of condensate, which then must be removed at the higher rate. It is this high rate of removal of the condensate that has proved a limiting factor in increasing the speed of operation of paper-making machines.

In accordance with the present invention, this limitation has been overcome by enhancing the entrainment of condensate in the steam being exhausted from the interior of the shell. The steam is directed to flow for substantial distances along the surface of the condensate inside the shell. Pressure is applied to the steam sufficient to move the steam at velocities at which the steam shears water from the inner surface of the shell and entrains the water in the steam as the steam leaves the interior of the shell. More particularly, the steam is accelerated as it moves along the surface of the condensate into a plurality of orifices disposed along the length of an exhaust manifold extending substantially the length of the dryer shell. The accelerating steam exerts a shear force on the surface of the condensate which accelerates the condensate toward the orifices. The velocity of the turbulent flow of condensate is increased until the water is entrained in the steam. Because the steam is accelerating, continued entrainment of the condensate is assured.

It is therefore a primary object of this invention to provide a method of removing condensate rimming the inner surface of a dryer shell by conducting steam along the surface of the condensate for substantial distances at velocities sufficient to shear water from the inner surface of the shell and entrain the water in the steam as it passes from the interior of the dryer shell. It is further an object of the invention to provide such method wherein the steam is directed through flow channels of decreasing cross section area to accelerate the steam as it leaves the interior of the dryer shell, thereby assuring continued entrainment of condensate in the steam.

Other objects and advantages of the invention will become apparent from the following detailed description taken in conjunction with the accompanying drawings in which:

FIG. 1 is an illustration partly in section and partly diagrammatic of a dryer incorporating the condensate removal system of the present invention;

FIG. 2 is a sectional view of the dryer of FIG. 1 taken along line 2—2 of FIG. 1;

FIG. 3 is an enlarged sectional view of the exhaust manifold and orifice plate shown in FIG. 2;

FIG. 4 is a plan view of the orifice plate shown in FIG. 3;

FIG. 5 is a perspective view of the orifice plate shown in FIG. 3;

FIG. 6 is an enlarged sectional view of an alternative exhaust manifold and orifice plate; and FIG. 7 is substantially a plan view of the exhaust manifold and orifice plate shown in FIG. 6.

In FIGS. 1 and 2 is illustrated a Yankee dryer 10 incorporating the water-removal apparatus of the present invention. The dryer 10 is formed of a cylindrical shell 12 closed at its ends by end closures 14 and 16. The dryer is rotatably mounted in bearings 18 and 20 and is rotated by a gear 22 driven by a source of power. Steam is supplied under pressure to the interior of the shell 12 from an external boiler. The steam is supplied from a supply conduit 24 through a rotatable coupling 26 which couples the stationary conduit 24 to an annular passageway 28 through the rotating end closure 16 while sealing the steam flow from the atmosphere and from the exhaust steam. The pressure of the steam within the shell 12 is controlled by a valve 30 and measured by a pressure gauge 32.

In a paper-making machine, a wet web to be dried is carried around the shell 12 on the outer surface of the shell. The pressurized steam heats the shell 12, transferring thermal energy to the outer surface of the shell. Heat from the shell 12 then passes to the web and vaporizes the water therein, thereby drying the web. The transfer of thermal energy from the steam to the web cools the steam, thereby condensing water upon the interior surface of the shell 12. In high velocity machines as here contemplated, the condensate rims the shell. That is, it is held thereagainst by the centrifugal force occasioned by the high speed rotation of the shell 12.

For efficient operation of the dryer, it is necessary to remove the condensate from the inner surface of the shell 12. This is achieved by exhausting the condensate with the steam into exhaust manifolds 34 mounted adjacent the inner surface of the shell 12 and rotating therewith. As shown, the exhaust manifolds 34 may be secured by struts 36 to a core 38 extending between the end closures 14 and 16. The exhaust manifolds 34 are evenly spaced circumferentially about the shell 12 and run substantially the entire length of the shell 12. As will be explained in greater detail below, the steam pressure within the shell 12 expels the steam from the interior of the shell 12 into the respective exhaust manifolds 34 carrying condensate with it. The steam and condensate pass from the manifolds 34 through exhaust outlets 40 and thence through an outlet passageway 42 extending through the center of the steam inlet passageway 28. The passageway 42 is coupled through the rotatable coupling 26 to an exhaust conduit 44, whence the steam and condensate may be expelled as waste or reclaimed. The rate of flow of steam from the shell 12 into the exhaust system is controlled by a valve 46 in the exhaust conduit 44. The exhaust steam pressure may be measured by a gauge 48. The difference in pressures at the respective gauges 32 and 48 is a measure of the pressure gradient driving the steam through the dryer and carrying the condensate with it from the interior of the shell 12.

Inasmuch as the manifolds 34 rotate with the shell 12, they remove condensate only in the vicinity of the manifolds 34. However, gravity and the rotation of the shell 12 causes the condensate to flow around the interior surface of the shell 12 so that condensate flows toward the manifolds 34 for removal. In particular the condensate flows to make the layer of condensate thicker at the top of the shell 12. This is occasioned by the force of gravity, which slows the condensate down at it moves toward the top and speeds it up as it moves downwardly, thus accumulating more at the top.

FIGS. 3 to 5 show in greater detail the preferred embodiment of the system of the present invention for entraining the condensate in the steam being exhausted. An orifice plate 50 is secured to the outer surface of each exhaust manifold 34. Each orifice plate 50 is penetrated by a plurality of orifices 52 spaced across the exhaust manifold 34 and providing fluid communication between the interior of the shell 12 and the interior of a respective exhaust manifold 34. The orifices 52 are preferably equally spaced along the entire length of each manifold 34 except that the orifice arrangement may be modified at each end, taking the boundary conditions into account. For example, additional end orifices 54 may be added. The orifices 52 are disposed adjacent the inner surface 60 of the shell 12, being spaced therefrom by from about 1/16 inch to about 1/8 inch.

Extending to the respective orifices 52 are flow channels 56 defined by the outer wall 58 of each orifice plate 50 and the inner surface 60 of the shell 12. Each channel 56 extends generally parallel to the inner surface 60 of the shell 12 and hence generally parallel to the surface of the condensate carried thereon. This directs the flow of steam along the surface of the condensate for a substantial distance, giving the steam a substantial time interval and a substantial distance upon which to act upon the condensate. The steam pressure gradient causes the steam to pass over the condensate and create shear forces accelerating the condensate toward the orifices 52 until the condensate is sheared from the surface of the shell 12 and entrained in the steam. Entrainment of the condensate in the steam occurs when the condensate flows turbulently at a velocity in excess of about 15 feet per second. Sufficient pressure gradient is applied to the steam to achieve this velocity. For effective operation, the length of the flow channels 56 should be of the order of at least ½ inch. On the other hand, if the length of the flow channels 56 is more than about 4 inches, puddling may occur.

In the embodiment of the invention illustrated in FIGS. 3 to 5, the cross-sectional area of each passageway is decreased in the direction of flow of the steam. This causes the steam to be constantly accelerated as it approaches the respective orifices 52. This provides for relatively gentle acceleration of the condensate toward the orifices at the beginning of the flow channels with the shear force constantly increasing in the direction of the orifices 52. The condensate is thus accelerated until there is sufficient turbulence to shear the condensate from the shell 12 and entrain it in the steam. Inasmuch as the steam is being constantly accelerated, the condensate once entrained will remain entrained.

The steam and condensate, after passing through the orifices 52, pass through inlet tubes 62 into the interior of the manifolds 34. Outlet tubes 64 extend into the respective manifolds 34 from respective exhaust outlets 40. Each outlet tube 64 extends outwardly beyond the inward ends of the inlet tubes 62. Indeed, the outlet tubes 64 extend to a point adjacent the walls 66 of the manifolds 34, being spaced therefrom by about 1/8 inch. The total cross-sectional area of the outlet tubes 64 is made less than the total cross-sectional area of the inlet tubes 62. This produces acceleration of the steam as it leaves the manifolds 34 assuring continued entrainment of the condensate in the steam flow.

It may be noted that since the manifolds 34 and orifices 52 move with the inner surface of the shell 12, the condensate may be collected from both directions transverse to the manifolds 34. Efficiency of collection is therefore increased by extending the flow channels in both transverse directions from each orifice 52 as in the embodiment shown in FIGS. 3 to 5.

An alternative embodiment of the present invention is shown in FIGS. 6 and 7. In general, this embodiment is not as efficient in the removal of condensate as the embodiment shown in FIGS. 3 to 5. However, it is particularly adaptable for installation in certain dryers. In the embodiment shown in FIGS. 6 and 7, the flow channels 56 are of substantially constant cross section, and only one channel extends to each orifice. Further, the apparatus does not include outlet tubes; rather, the exhaust outlets 40 are connected directly to the ends of the manifolds 34.

Empirical data acquired in various comparative tests provide dramatic evidence of the improved efficiency and efficacy of the condensate removal system of the present invention. Perhaps the clearest demonstration was in tests made before and after converting a particular Yankee dryer. These tests were made on a paper-making machine having a 15 foot Yankee dryer. The paper-making machine was operating at a lineal speed of about 2500 ft./min. to make creped tissue of basis weight of about 13.5 lb. The only change made in the machine was in the change to the shaped orifice plates 50 of FIGS. 6 and 7 from flat orifice plates extending sharply away from the inner surface 60 of the shell 12 and having no channels parallel to the inner surface.

With the flat orifice plates, about 60 p.s.i. of steam was supplied to the interior of the shell 12 to dry the paper, and a pressure differential of about 25 p.s.i. (as measured at the gauges 32 and 48) was required to remove the condensate. At somewhat higher pressures it became practically impossible to remove the condensate as fast as it formed, resulting in an increase in the thickness of the layer of condensate rimming the shell 12 until the thickness became greater than the spacing between the shell 12 and the manifolds 34, whereupon the latter acted as dams to the flow of condensate. This made cool regions on the outer surface of the shell 12 and impaired both the uniformity and the rate of drying.

With the orifice plates 50 of FIGS. 6 and 7 bolted to the manifolds 34 in place of the flat orifice plates, about 95 p.s.i. of steam was supplied to the interior of the shell 12, and a pressure differential of only about 14.5 p.s.i. was sufficient to remove the condensate, even though more condensate was formed. The condensate was maintained at a uniform level of about 0.080 inch. This promoted uniform, rapid and more efficient drying at the elevated temperature while requiring less energy to remove the condensate, representing substantial savings in energy costs. It makes possible the operation of paper-making machines at higher speeds with proper web drying, although for these tests the speed of the dryer was kept the same. It also permitted reduction in the load on the apparatus for the hot air drying of the outside of the sheet.

The system of FIGS. 3 to 5 was installed in a different dryer on another paper-making machine, so test results are not entirely comparable. However, the dryer with this system can operate at a pressure of about 125 p.s.i. with a pressure differential of only about 5 p.s.i. needed to remove the condensate. This provides even greater efficiency and economy in the removal of condensate than provided by the system of FIGS. 6 and 7, and at the same time this permits operation of the paper-making machine at higher speeds with attendant improvement in efficiency and economy in the operation of the overall machine.

Various modifications may be made in the system within the scope of the invention. For example, different shapes of orifice plates and manifolds may be used. The design used depends in part upon the size and operating conditions of the particular dryer in which the system is used. Various features believed to be novel are included in the following claims.

What is claimed is:

1. In a method of removing condensate rimming the inner surface of the shell of a rotary dryer, the shell being adapted to receive steam under pressure into the hollow interior thereof for heating the shell to dry material passed over the outer surface thereof, resulting in the formation of condensate in the interior of the shell, the condensate being removed by the steam through a plurality of orifices into an exhaust manifold within the shell and exhausted to the exterior of the shell, the manifold being mounted adjacent the shell for movement therewith and extending in the axial direction of the shell substantially the entire length thereof while at the same time being mounted independently of the shell and spaced therefrom and out of contact therewith, the orifices being disposed along substantially the entire length of the shell adjacent the inner surface of the shell for movement therewith, the improvement comprising the steps of directing the steam prior to its entering said orifices into a plurality of adjoining confined streams which flow generally parallel to the direction of motion of the interior surface of the shell along the surface of the condensate in the shell over a susbtantial distance, said streams being successively disposed subtantially continuouly along the entire length of the shell, and accelerating each confined stream as it approaches a respective one of said orifices to a velocity sufficient to shear water from the inner surface of the shell and entrain water in the respective stream as it passes through the orifice.

2. The method of claim 1 wherein the steam is substantially continuously accelerated as it approaches the orifices.

3. The method of claim 2 wherein the steam with water entrained therein is further accelerated as it is directed from the exhaust manifold.

4. In a method of removing the condensate rimming the inner surface of the shell of a rotary dryer, the shell being adapted to receive steam under pressure into the hollow interior thereof for heating the shell to dry material passed over the outer surface thereof, resulting in the formation of condensate in the interior of the shell, the condensate being removed by the steam through a plurality of orifices into an exhaust manifold within the shell and exhausted to the exterior of the shell, the manifold being mounted adjacent the shell for movement therewith and extending in the axial direction of the shell substantially the entire length thereof while at the same time being mounted independently of the shell and spaced therefrom and out of contact therewith, the orifices being disposed along substantially the entire length of the shell adjacent the inner surface of the shell for movement therewith, the improvement comprising the steps of directing the steam prior to its entering said orifices into a plurality of adjoining confined streams which flow generally parallel to the direction of motion of the interior surface of the shell along the surface of the condensate in the shell over a distance of the order of at least one-half inch, said streams being successively disposed substantially continuously along the entire length of the shell, and accelerating each confined stream as it approaches a respective one of said orifices to a velocity sufficient to move the surface of the condensate at a rate of at least about 15 feet per second and entrain condensate in the respective stream as the stream exits through the orifice.

References Cited

UNITED STATES PATENTS

| 3,426,839 | 12/1969 | Overton | 165—89 |
| 3,308,554 | 3/1967 | Overton | 34—124 |
| 3,492,741 | 2/1970 | Witworth | 34—124 |
| 1,594,718 | 8/1926 | Fulton | 34—124 |

MILTON KAUFMAN, Primary Examiner

T. W. STREULE, Assistant Examiner

U.S. Cl. X.R.

165—1